UNITED STATES PATENT OFFICE.

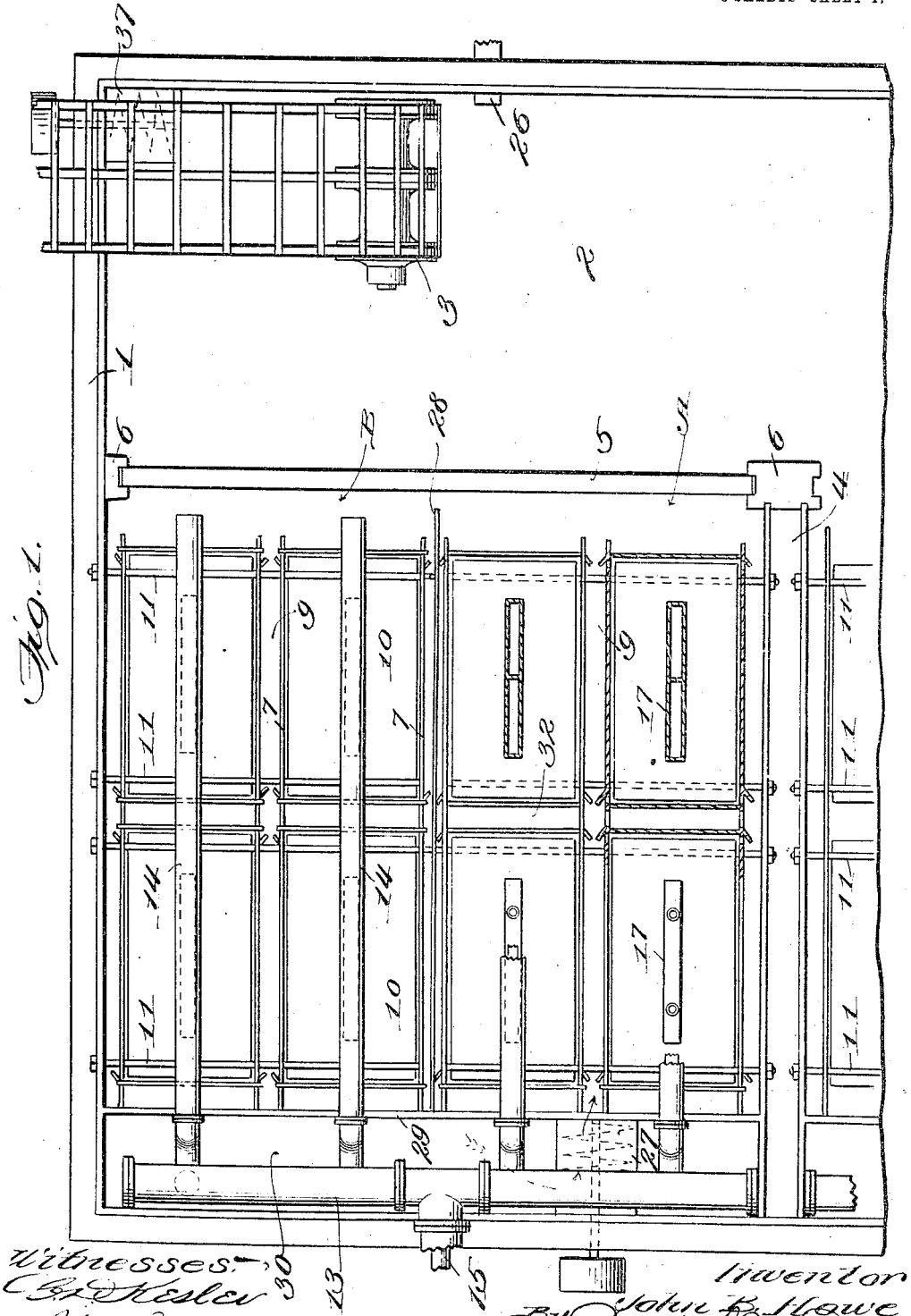

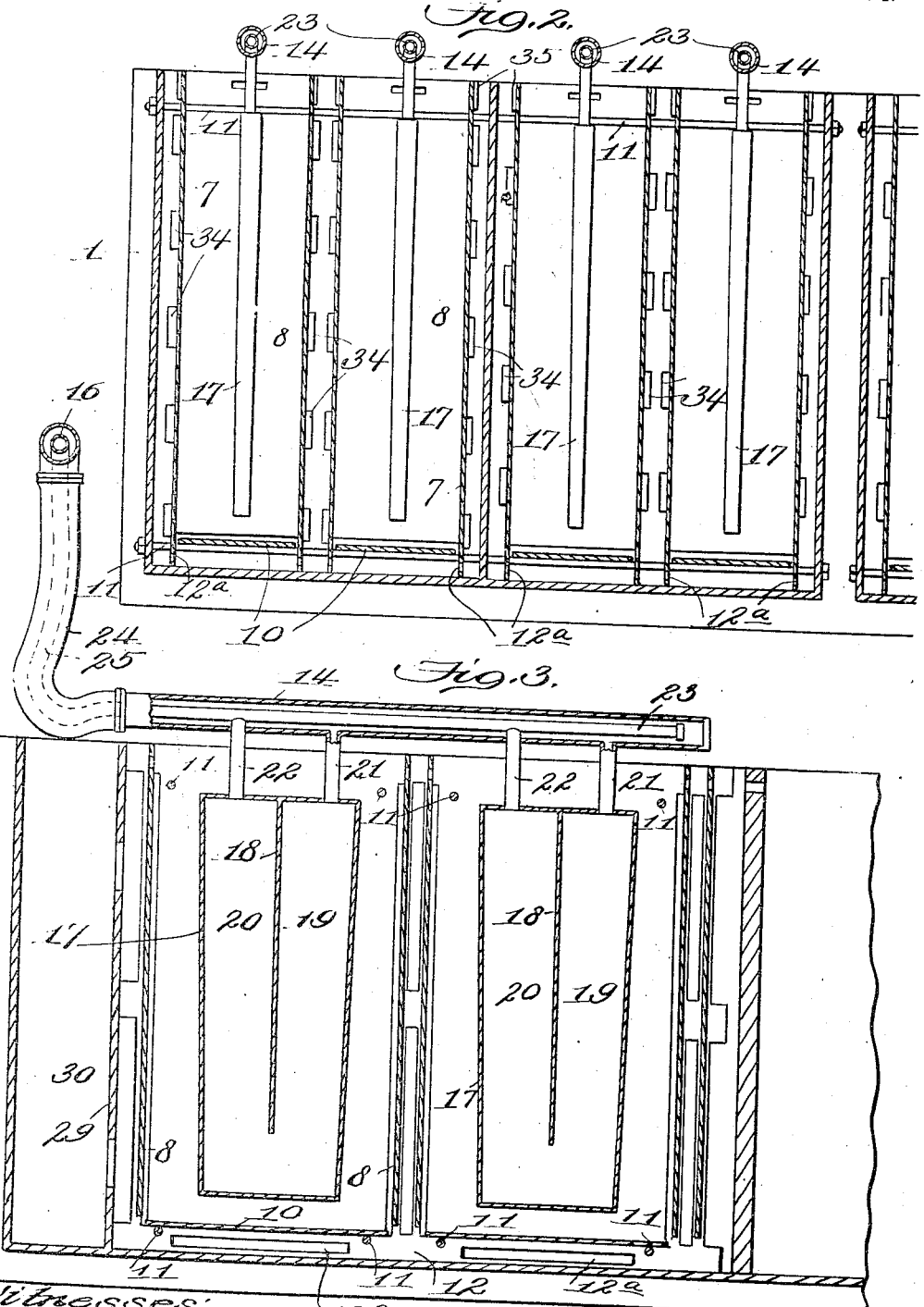

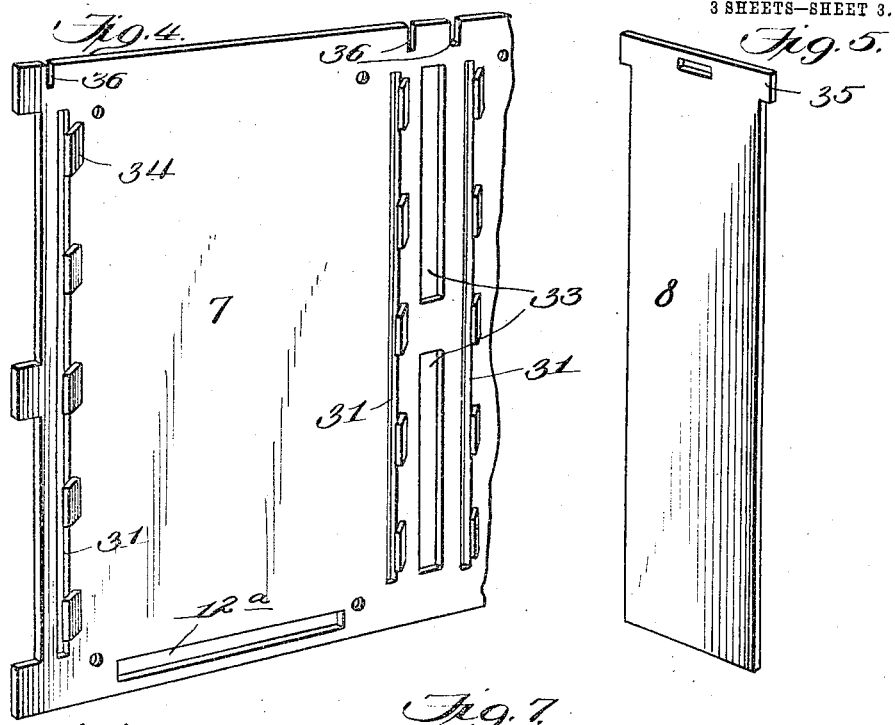
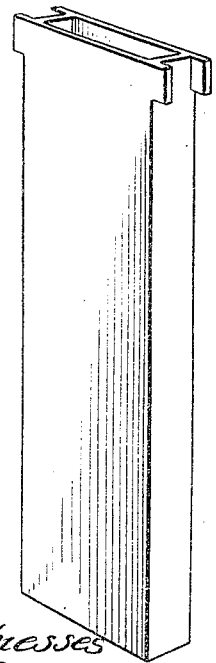
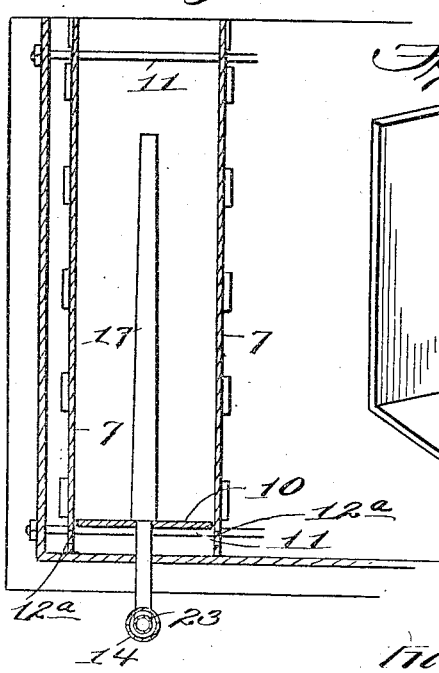

JOHN B. HOWE, OF NASHVILLE, TENNESSEE.

ICE-MAKING APPARATUS.

969,696.   Specification of Letters Patent.   Patented Sept. 6, 1910.

Application filed March 29, 1910. Serial No. 552,206.

*To all whom it may concern:*

Be it known that I, JOHN B. HOWE, a citizen of the United States, residing at Nashville, in the county of Davidson and State of Tennessee, have invented new and useful Improvements in Ice-Making Apparatus, of which the following is a specification.

This invention relates to improvements in ice making apparatus and it comprehends an apparatus for producing ice blocks of certain dimensions and which is specially constructed with regard to the primary considerations, first, of a convenient, quick and inexpensive ice harvesting operation; second, of a highly efficient water circulating and agitating operation; and third, of a reduction in the expense and time of successive freezing operations.

An embodiment of the invention is illustrated in the accompanying drawings, wherein—

Figure 1 is a top plan view of an improved ice making apparatus in accordance with the present invention; Fig. 2 is a cross sectional view of one of the freezing tanks; Fig. 3 is a longitudinal view of one of the freezing tanks; Fig. 4 is a detail perspective view of a specially constructed mold plate, forming a side of a mold; Fig. 5 is a similar view of a mold plate for the end of a mold; Fig. 6 is a detail perspective view of an alternative end mold plate construction; Fig. 7 is a detail sectional view showing an alternative arrangement of brine circulating system; and Fig. 8 is a detail perspective view of an alternative mold construction which may be employed in connection with the form of apparatus shown in Fig. 7.

Similar characters of reference designate corresponding parts throughout the several views.

According to the present invention one or more freezing tanks are arranged within a main tank, as 1, which contains a body of water sufficient for several freezing operations. At one end of the tank 1, a clear space, as 2, is provided into which the ice blocks are floated from the freezing tanks and from which they are removed by a suitable conveyer, e. g. an endless belt arrangement, as 3. The freezing tanks are arranged at the side of the tank 1 opposite to the harvesting space 2. One freezing tank is shown complete, as arranged at one corner of the tank 1 and its side walls comprise an adjacent side wall of the tank 1 and a partition wall, as 4, and its end walls comprise an adjacent end wall of the tank 1 and a removable wall or bulkhead, as 5. The partition walls 4 separate the freezing tanks from one another, and the removable walls 5, which are preferably vertically slidable in guides 6, separate the freezing tanks from the harvesting space 2. The various walls are, of course, suitably constructed with regard to heat insulation. Water to be frozen is admitted from the harvesting space 2 to the several freezing tanks and therein is formed into blocks of ice by a plurality of specially constructed molds, which will now be described. The side walls of the ice block molds consist of plates, as 7, which are disposed longitudinally of the freezing tanks and the end walls of the ice block molds consist of plates, as 8, which are disposed transversely of the freezing tanks. The plates 7 are arranged in pairs, the plates of each pair having a somewhat close association to provide for narrow channels, as 9, between the molds. The two plates thus defining a channel 9, also constitute adjacent side walls for the two adjacent molds.

In addition to the plates 7 and 8, the molds are provided with bottom plates, as 10. For reinforcing purposes several transverse tie rods, as 11, are employed which extend transversely of the freezing tanks between the side walls thereof. The bottom plates 10 are supported on the rods 11, as shown in Fig. 3, and are suitably spaced from the adjacent end and side walls of the molds so as to provide for an efficient circulation and agitation of the water to be frozen. Beneath the bottom plates 10 and the floor of the tank 1, channels, as 12, intervene, and through which the water to be frozen circulates, the plates 7 having openings, as 12ª, to establish communication between the channels 9 and 12. The plates 7 are coextensive in length with the extent of a longitudinal row of molds, and are constructed at intervals to form side walls for each mold of the aforesaid longitudinal row.

In connection with the molds, a brine circulating system is employed, the preferred form of which is shown in Figs. 1, 2 and 3, and is similar to the system shown in Fig. 5 of the U. S. patent to Havenstrite, No. 938,853. The brine circulating system includes a main double brine header, as 13, and a plurality of lateral double brine headers, as 14. As shown, the header 13 is connected by a pipe, as 15, to a source of brine supply, and includes an internal conducting tube, as 16, closed at its ends in the same manner as shown in the Havenstrite patent referred to. Within each mold a brine circulation box, as 17, is provided. The boxes 17 are carried by and pendent from the headers 14 and are each formed with a central partition, as 18, affording two parallel channels, as 19 and 20. At the upper ends of each box 17, nipples, as 21 and 22 are provided. The nipple 21 supplies brine to the channel 19 and the nipple 22 conducts brine from the channel 20. The lateral brine headers are similar to the main brine header in that they are each provided with an internal conducting tube, as 23. The nipples 21 are connected directly to the outer tube of the lateral headers 14 and the nipples 22 are connected to the internal tubes 23 of said headers. The lateral headers are, in turn, connected to the main header 16 by a flexible connection, as 24, which joins the outer tube of the header 13 and the outer tube of the lateral header 14 and within which an internal flexible tube, as 25, to join the internal tubes 16 and 23, is provided.

In use, the brine flows into the outer tube of the header 13 and passes from thence into the outer tubes of the headers 14, passing from thence through the nipples 21 and flowing downwardly through the channels 19 and upwardly through the channels 20, leaving the latter through the nipples 22 and flowing into the internal tubes 23 of the lateral headers, from whence it passes to the internal tube 16 of the main header, and by said tube 16 is properly disposed of in a suitable manner, e. g., in the manner shown in the Havenstrite patent referred to.

During the freezing operation water is caused to circulate through the various channels of the freezing tanks and through the molds, and for this purpose the following arrangement and structural details are employed. Into an end wall of the tank 1 adjacent the space 2, a water feed pipe, as 26, is fitted. A portion of the water thus admitted into the harvesting space is, prior to the freezing operation, diverted into the freezing tanks, the removable walls 5 being raised for this purpose. When the freezing tanks are filled, the walls 5 are lowered and the freezing operation is commenced by causing brine to circulate through the system and by simultaneously causing a continuous agitation and circulation of the water in the freezing tanks. For the purpose of producing this agitation and circulation, any desired means may be employed. For example, in Fig. 1, a propeller arrangement, as 27, has been shown. Each freezing tank is divided by a central longitudinal partition wall, as 28, into two sections A and B, and the water is caused to circulate in one direction through one section and in an opposite direction through the other section. At some distance from the front end walls of the freezing tank, a false end wall, as 29, is provided, in each instance, and from which the partition 28 extends, the latter terminating slightly short of the removable wall or bulkhead 5. Between the false end wall 29 and an end wall of each tank, a circulation space or channel, as 30, is provided and the channels 9 and 12 of the section B communicate with the circulation channel or space 30 through openings in the wall 29 (Fig. 3), while the channels 9 and 12 of the section A communicate with said circulation channel or space only through the propeller opening. The channels 9 likewise communicate with the interior of the molds through openings, as 31, which are provided in the plates 7. In the embodiment shown in Fig. 1, transverse channels, as 32, intervene between the adjacent plates 8 and the channels 32 are in open communication with the bottom channels 12 and also with the longitudinal channels 9, through openings, as 33, in the plates 7.

The water is caused to circulate by the agitator or propeller 27, through the channels 9 of the section A toward the wall 5 and, flowing around the end of the partition 28, returns through the channels 9 of the section B to the circulation space or channel 30. Incident to the flow of water through the channels 9, a continuous circulation is had on all sides of the molds, the water also flowing through the channels 32 and through the channels 12, as well as within the interior of the molds. To induce the circulation of water through the interior of the molds, the plates 7 are provided with angularly disposed projections, as 34, which extend outwardly into the channels 9 and by which the water is deflected through the openings 31 and into the interior space of the molds. It will be observed that the projections on the plates 7 of the section A extend forwardly so as to deflect the water as it flows rearwardly and the projections on the plates 7 of the section B extend rearwardly so as to deflect the water as it flows forwardly.

After the freezing operation has been completed warmer brine is passed through the brine circulation boxes for the purpose of thawing them free of the ice and said boxes are then withdrawn from the ice blocks, the end plates 8 are removed, and the wall 5 is raised, at which time the plates 7 define uninterrupted longitudinal channels which communicate directly with the harvesting space 2 and through which the ice blocks are floated into the harvesting space, being removed from the latter by the conveyer 3. To facilitate the removal of the brine circulation boxes 7, the header 13 is disposed at some distance above the headers 14 and is connected to the latter by the flexible pipes 24 and 25 aforesaid. To facilitate the removal of the end walls 8, the latter are preferably hung from the plates 7 and are each provided at their upper ends with oppositely projecting lugs, as 35, which serve as hangers and engage in recesses, as 36, cut into the upper edges of the plates 7. It is also desired to maintain a circulation and agitation of the water during the harvesting operation and for this purpose one or more agitators, as 37, are provided in the harvesting space 2.

In Fig. 6 an alternative form of end wall construction for the molds is shown. According to this arrangement the plates 8 are permanently connected in pairs and form the walls of a box-like structure, the use of which may be desired under certain conditions. With this arrangement tepid water may be poured into the end boxes to aid in the thawing operation.

In the alternative construction shown in Fig. 7, instead of having the brine circulating system arranged above the freezing tanks, as in the construction shown in Fig. 1, said system is arranged below the freezing tanks, and the boxes 17 are permanently associated with the molds and are insulated from the bottoms thereof in order that the harvesting operation may not be rendered difficult.

In connection with the structural form shown in Fig. 7, the mold construction shown in Fig. 8 may be employed. In this construction the bottom or end walls of the molds may be made integral, or otherwise permanently connected, the construction of the side walls of the mold being the same as that heretofore described.

In operation the freezing tanks, having been charged with water in the manner explained, the freezing operation is commenced by causing the circulation of brine through the brine system, and by causing the circulation of water through the various channels, as has been set forth. The blocks are frozen upon the boxes 17 and the freezing operation is continued until the blocks are of the desired mechantable size, at which time the freezing operation is stopped. It is not proposed to freeze all the water in the tanks but only the water which is within the molds. Consequently, when the freezing operation is interrupted, clear water occupies the channels 9 and 32. After the freezing operation has been completed, the boxes 17 are withdrawn from the ice blocks. This is accomplished by lifting the headers 14 which carry said boxes, a suitable means (not shown and which forms no part of the present invention) being provided for this purpose. The end plates 8 and the bulkhead 5 having been removed, the water remaining in the harvesting space 2 mingles with the clear unfrozen water remaining in the freezing tanks at the end of the freezing operation, and the ice blocks are floated through the longitudinal channels defined by the plates 7 into the harvesting space, in the manner explained.

The advantages of this system are numerous. As has been seen from the foregoing description, it provides for a convenient, quick and inexpensive ice harvesting operation. This is not only due to the readiness with which the ice blocks are removed from the freezing tanks but also to the fact that the thawing of the ice blocks from the walls of the molds, is effected by the water admitted into the freezing tanks from the harvesting space 2 after the freezing operation. The superiority of this method of thawing the ice blocks from the walls of the molds is due to the fact that by using the water in the harvesting space for this purpose, it is unnecessary to introduce a warm liquid into the system. In the known systems the thawing of the ice blocks is effected by introducing a warm liquid into the system and this heats the system and renders it necessary for the machinery to remove the surplus heat before the next freezing operation can be fairly started. Not only is the feature of thawing the ice blocks by the water in the harvesting tank of advantage in that it dispenses with the necessity of using a warm liquid for this purpose but it is also of advantage in that it provides for a material lowering of the temperature of the water to be employed in the next freezing operation. This is by reason of the fact that the temperature of the water remaining in the freezing tanks at the time the freezing operation is interrupted is already near the freezing point and consequently, when such water mingles with the water in the harvesting space, the temperature of the latter is reduced. This reduction of temperature is also aided by causing the ice blocks to float through the harvesting space. The water in the harvesting space is thus cooled by two mediums, viz. the water remaining in the freezing tanks at the end of the freezing operation, and the ice blocks. Even where the ice blocks are not harvested by floating them through the harvesting space, but by lifting them from the molds by a suitable crane, the method which is employed in the construction of Fig. 7, the unfrozen water in the freezing tanks at the end of the freezing operation is very efficient in lowering the temperature of the water in the harvesting space.

The freezing tank construction is particularly efficient in the production of clear, pure ice, in a minimum period of time. As has been seen from the previous description the water is caused to circulate through all parts of the freezing tank, and this continuous circulation and agitation is effective in brushing the air bubbles and extraneous matter from the surface of the ice as fast as it becomes frozen and of thus providing for a product of superior grade, having no trapped air bubbles, clear and not opaque, and without impurities. As a result of this advantage of the apparatus it is not necessary to use distilled water in the freezing operation and consequently the usual distilling plant and its attendant expense, is eliminated. The construction likewise provides for a quicker ice freezing operation than is had by the standard plate ice system, since in each freezing tank there is a multiplicity of brine circulating areas arranged at suitable intervals, and interrupting the distance through which the heat units must pass. It follows that by materially reducing the time required for freezing a given quantity of ice, a material economy of floor space may be practiced. Withal, the system is of inexpensive construction, both as to the structure of the various parts involved and as to their assemblage.

Having fully described my invention, I claim:

1. An ice making apparatus comprising a main tank having a water containing harvesting space at one end thereof, a refrigerating tank at one side of the harvesting space, plates disposed longitudinally in the refrigerating tank to form mold side walls and defining intervening channels between the molds and with which the molds are in communication, plates disposed transversely and removably between the longitudinal plates to form mold end walls, a removable bulkhead to separate the refrigerating tank from the harvesting space during the freezing operation, a brine circulating system including boxes which are disposed in the molds and upon which the ice blocks are frozen, and means for causing a circulation of water in the main tank.

2. An ice making apparatus comprising a main tank having a water containing harvesting space at one end thereof, a refrigerating tank at one side of the harvesting space, plates disposed longitudinally in the refrigerating tank to form mold side walls and defining intervening channels between the molds and with which the molds are in communication, plates disposed transversely and removably between the longitudinal plates to form mold end walls, a removable bulkhead to separate the refrigerating tank from the harvesting space during the freezing operation, a brine circulating system including elevatable boxes which are disposed in the molds and upon which the ice blocks are frozen, and means for causing a circulation of water in the main tank.

3. An ice making apparatus comprising a main tank having a water containing harvesting space at one end thereof, a refrigerating tank at one side of the harvesting space, plates disposed longitudinally in the refrigerating tank to form mold side walls and defining intervening channels between the molds, plates disposed transversely and removably between the longitudinal plates to form mold end walls, the longitudinal plates having openings to afford communication between the interior of each mold and the intervening channels and having projections adjacent the openings to deflect water therethrough into the molds, a removable bulkhead to separate the refrigerating tank from the harvesting space during the freezing operation, a brine circulating system including boxes which are disposed in the molds and upon which the ice blocks are frozen, and means for causing a circulation of water in the main tank.

4. An ice making apparatus comprising a main tank having a water containing harvesting space at one end thereof, a refrigerating tank at one side of the harvesting space, plates disposed longitudinally in the refrigerating tank to form mold side walls and defining intervening channels between the molds and with which the molds are in communication, plates associated as pairs and disposed transversely and removably between the longitudinal plates to form mold end walls and to define transverse channels communicating with said longitudinal channels, a removable bulkhead to separate the refrigerating tank from the harvesting space during the freezing operation, a brine circulating system including elevatable boxes which are disposed in the molds and upon which the ice blocks are frozen, and means for causing a circulation of water in the main tank.

5. An ice making apparatus comprising a main tank having a water containing harvesting space at one end thereof, a refrigerating tank at one side of the harvesting space, plates disposed longitudinally in the refrigerating tank to form mold side walls and defining intervening channels between the molds and with which the molds are in communication, plates disposed transversely and removably between the longitudinal plates and associated in pairs to form mold end walls and to define intervening channels between the molds, bottom plates for the molds arranged in spaced relation to the floor of the refrigerating tank, the space under the bottom plates being in communication with the spaces between the longitudinal and transverse plates, a removable bulkhead to separate the refrigerating tank from the harvesting space during the freezing operation, a brine circulating system including boxes which are disposed in the molds and upon which the ice blocks are frozen, and means for causing a circulation of water in the main tank.

6. An ice making apparatus comprising a main tank having a water containing harvesting space at one side thereof, a refrigerating tank at one side of the harvesting space, a removable bulkhead to separate the refrigerating tank from the harvesting space during freezing, the refrigerating tank being supplied with water from the harvesting space, means for freezing ice blocks in the refrigerating tank, and means for causing a circulation of water in the refrigerating tank during freezing.

7. An ice making apparatus comprising a main tank having a water containing harvesting space at one side thereof, a refrigerating tank at one side of the harvesting space, a movable bulkhead to separate the refrigerating tank from the harvesting space during freezing, the refrigerating tank being supplied with water from the harvesting space, means for freezing ice blocks in the refrigerating tank, an ice block conveyer in the harvesting space, and means for causing a circulation of water in the refrigerating tank during freezing.

8. An ice making apparatus including a refrigerating tank, a plurality of ice block molds arranged in alining rows therein and spaced on all sides from one another, bottom plates for the molds spaced from the bottom of the tank, the space under the bottom plates and the interior spaces of the molds communicating with the spaces between the molds, the latter having removable end walls, means for freezing ice blocks in the molds, and means for causing the circulation of water through the several spaces aforesaid.

9. An ice making apparatus including a refrigerating tank, a plurality of ice block molds arranged in alining rows therein and spaced on all sides from one another, bottom plates for the molds spaced from the bottom of the tank, the space under the bottom and the interior spaces of the molds communicating with the spaces between the molds, the latter having removable end walls and having their side walls provided with openings and with projections adjacent the openings to deflect circulating water into the interior spaces of the molds, and means for causing the circulation of water through the several spaces aforesaid.

10. An ice making apparatus including a refrigerating tank, plates disposed longitudinally in the tank to form mold side walls, mold end plates disposed transversely of the longitudinal plates, the latter being associated in pairs to define intervening longitudinal channels between the molds and having openings to afford communication between the channels and the interior mold spaces, means for causing a circulation of water through the channels and through the interior mold spaces, and means for freezing the water in each mold space.

In testimony whereof I have hereunto set my hand in presence of two subscribing witnesses.

JOHN B. HOWE.

Witnesses:
R. B. C. HOWELL,
J. M. WHITSILL.